United States Patent [19]

Hoffman

[11] Patent Number: 5,688,874
[45] Date of Patent: Nov. 18, 1997

[54] PROCESS FOR PREPARING BLENDS OF POLY(ETHYLENE TEREPHTHALATE) AND POLY(ETHYLENE 2,6-NAPHTHALENEDICARBOXYLATE)

[75] Inventor: Douglas Claire Hoffman, Kingsport, Tenn.

[73] Assignee: Eastman Chemical Company, Kingsport, Tenn.

[21] Appl. No.: 576,888

[22] Filed: Dec. 22, 1995

[51] Int. Cl.$^6$ ..................................................... C08L 67/02
[52] U.S. Cl. .......................... 525/444; 528/481; 528/503
[58] Field of Search ............................ 525/444; 528/481, 528/503

[56] References Cited

U.S. PATENT DOCUMENTS

| | | |
|---|---|---|
| 3,546,320 | 12/1970 | Duling et al. . |
| 3,937,754 | 2/1976 | Shimotsuma et al. . |
| 4,069,278 | 1/1978 | Borman ..................... 525/444 |
| 4,408,022 | 10/1983 | Cincotta ..................... 525/444 |
| 4,643,925 | 2/1987 | Smith ........................ 428/35 |
| 5,006,613 | 4/1991 | Shepherd et al. . |
| 5,258,233 | 11/1993 | Mills et al. . |
| 5,266,413 | 11/1993 | Mills et al. . |
| 5,340,884 | 8/1994 | Mills et al. . |

FOREIGN PATENT DOCUMENTS

| | | |
|---|---|---|
| 47-24177 | of 1972 | Japan . |
| 49-22957 | of 1974 | Japan . |
| 50-74652 | of 1975 | Japan . |
| 56-49014 | of 1981 | Japan . |
| 3-05364 | of 1991 | Japan . |
| 96 35571 | 11/1996 | WIPO . |

OTHER PUBLICATIONS

Research Disclosure No. 28340, "Poly(Ethylene Naphthalenedicarboxylate)/Poly(Ethylene Terephthalate) Blends", Nov. 1987.
Research Disclosure No. 29410, "Poly(Ethylene Naphthalenedicarboxylate)/Poly(Ethylene Terephthalate) Blends", Oct. 1988.
Stewart et al. in Polymer, vol. 34, pp. 4060–4067.
Jenkins in the Proceedings of Specialty Polyesters '95, pp. 197–221.
Antec, vol. 2, 1 Jan. 1993, pp. 1222–1226, XP000573715, Stewart M E et al., p. 1223.
Colloid & Polymer Science, vol. 272, no. 11, 1 Aug. 1994, pp. 1352–1362, XP000574275, Andresen E. et al., p. 1353.

*Primary Examiner*—Patricia A. Short
*Attorney, Agent, or Firm*—Karen A. Harding; Harry J. Gwinnell

[57] ABSTRACT

The present invention relates to a process comprising solid state polymerizing an immiscible polyester blend which has not been substantially melt esterified under conditions sufficient to produce a polyester blend which when remelted becomes clear. Polyester blends having improved I.V., color and low acetaldehyde are also disclosed.

13 Claims, 3 Drawing Sheets

PROCESS FOR PREPARING BLENDS OF POLY(ETHYLENE TEREPHTHALATE) AND POLY(ETHYLENE 2,6-NAPHTHALENEDICARBOXYLATE)

This invention relates to a process for preparing blends of poly(ethylene terephthalate) (PET) and poly(ethylene 2,6-naphthalenedicarboxylate) (PEN). The process involves the solid state polymerization of PET/PEN blends that initially have a low level of transesterification. The PET/PEN blends undergo transesterification reactions as well as molecular weight building reactions in the solid state. The level of transesterification is easier to control and the blends have lower acetaldehyde levels than blends prepared by melt extrusion.

BACKGROUND

The use of poly(ethylene terephthalate).(PET) in producing clear, high barrier packages has found widespread acceptance. In specific applications higher performance materials that have the same clarity of PET are required. For example, polymers with higher gas barrier are desired for packaging oxygen sensitive ingredients, while polymers with higher heat distortion temperatures are sought for packaging hot-filled products. Poly(ethylene 2,6-naphthalenedicarboxylate) (PEN) meets both of these criteria as it possesses an oxygen barrier approximately five times greater than that of PET and a glass transition 45 K higher than PET. In certain instances enhancements of this magnitude are not required and intermediate improvements can be attained by using PET/PEN blends. However, PET/PEN blends are not inherently miscible and generally hazy, opaque articles result unless the blend undergoes transesterification reactions. In most packaging applications good clarity is a requirement and thus a material would normally need to be clear.

Transesterification reactions are typically Carried out at high temperatures in the melt where the level of transesterification is difficult to control and undesirable side reactions readily occur.

U.S. Pat. No. 3,546,320 (1970) discloses PET/PEN blends which contain at least five weight percent of a block copolymer comprising discrete polymer segments of PET and PEN. The resulting blends have at least 5 percent crystallinity. Also disclosed is a process for preparing PET/PEN polymer blends at temperatures between 250° C.–320° C. for a time long enough (0.1–2.0 hours) for the blend to become homogenous. U.S. Pat. No. 3,937,754 discloses the preparation of PET/PEN blends for biaxially oriented films. The blends are prepared by holding the mixture in a melt extruder at 295° C. for about 7 minutes. Mixing conditions at these times and temperatures are undesirable as they often lead to molecular weight loss and high levels of undesirable side products such as acetaldehyde and color bodies.

Japanese Patents 72/24177 (1972), 81/49014 (1981), 74/22957 (1974) and 75/74652 (1975) also disclose PET/PEN blends.

U.S. Pat. No. 5,006,613 discloses three component polymer blends of PET, PEN and a compatibilizing PEN/PET copolyester. This patent also discloses the difficulty in preparing packaging containers from blends with high levels of transesterification.

Research Disclosures 28340 (1987) and 29410 (1988) disclose the preparation of clear blends through melt blending but do not discuss the details of the melt blending step.

PET and PEN, PET/PEN copolymers and blends are widely used for the production of plastic articles because of their excellent properties. The molding or extrusion processes used to fabricate the articles results in acetaldehyde which is formed by thermal decomposition of the polyesters. The acetaldehyde in the article migrates into the contents of the article. Small amounts of the acetaldehyde adversely effect the flavor retaining property of foods and beverages and the fragrance retaining properties of foods, beverages, cosmetics and other packaged contents. For these reasons, it is useful to minimize the amount of acetaldehyde in these polyesters.

U.S. Pat. No. 5,258,233, 5,266,413 and 5,340,884 disclose the use of additives to minimize the formation of acetaldehyde in PET. The patents also disclose that acetaldehyde concentrations increase with higher processing conditions, thus it is desirable to use the mildest conditions possible. The patents do not disclose using the additives in PEN or PET/PEN copolymers or blends. Moreover, minimal melt processing conditions are not applicable to PET/PEN melt blending which generally requires long processing times and high processing temperatures to create clear articles.

Stewart et al. in Polymer, Volume 34, pages 4060–4067 and Jenkins in the Proceedings of Specialty Polyesters '95, pages 197–222 both discuss the need for long mixing times in the melt to promote homogeneity of PET/PEN blends.

WO 91/05364 discloses a process for decreasing the amount of transesterifcation which occurs during the solid stating of clear, miscible blends. Conventional melt blending techniques and conditions are employed.

DESCRIPTION OF THE INVENTION

Figure 1:
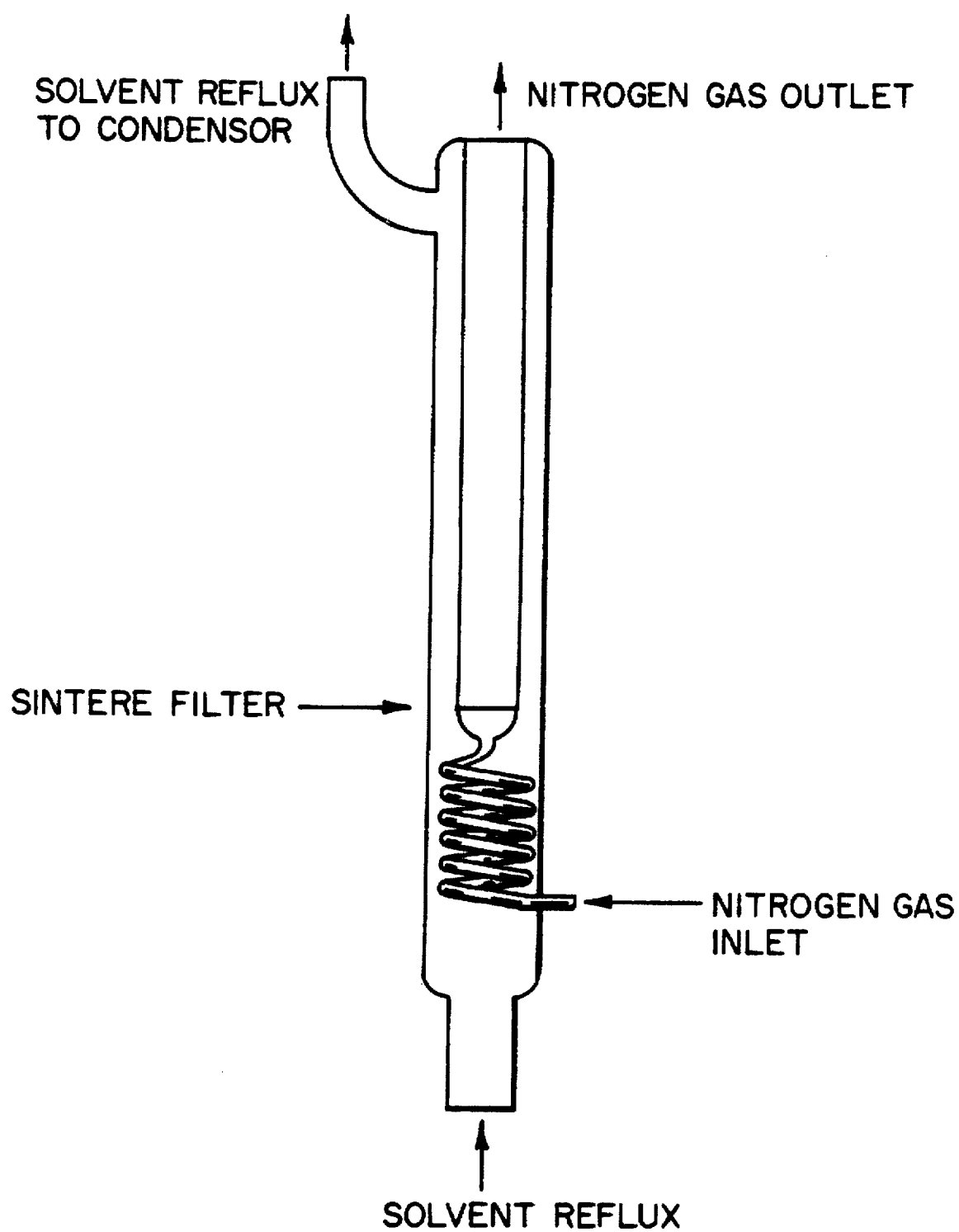
FIG. 1 is a drawing of a Solid State polymerization apparatus.

The present invention relates to a process comprising solid state polymerizing an immiscible polyester blend which has not been substantially melt esterified under conditions sufficient to produce a polyester blend which when remelted becomes clear.

We have surprisingly found that blends of PET and PEN with low levels of transesterification from the melt (immiscible blends) can be polymerized in the solid state to product blends with higher levels of transesterification, higher inherent viscosities (I.V.'s), lower acetaldehyde (AA) levels and improved color than blends which were transesterified in a melt extruder. Thus, in the present invention, the time in the extruder, and thus the transesterification in the extruder during the blending step is minimized. Preferably, the time the blend is processed in the extruder is limited to the time necessary to fully melt the blend components. The residence time and temperature can vary greatly depending on the extruder and temperature used, but generally mixing (without significant transesterification) can be achieved with a residence time of less than about 10 minutes, and more preferably from about 0.1 to about 2 minutes.

When the solid stated blends are remelted and processed into articles, the resultant articles are clear, have lower AA levels and improved color than clear blends prepared via conventional melt blending. The process eliminates the need for multiple extruder passes, additional handling steps and can be readily implemented in a continuous manufacturing system.

A wide range of homopolymer and copolymers may be used to form the blends. The dicarboxylic acid component of each polyester may be the same or different and is selected from aromatic dicarboxylic acids preferably having 8 to 14 carbon atoms, aliphatic dicarboxylic acids preferably having 4 to 12 carbon atoms, cycloaliphatic dicarboxylic acids preferably having 8 to 12 carbon atoms, and mixtures thereof. Examples suitable dicarboxylic acids include terephthalic acid, phthalic acid, isophthalic acid, 2,6-naphthalenedicarboxylic acid, cyclohexanedicarboxylic acid, cyclohexanediacetic acid, diphenyl-4,4'-dicarboxylic acid, succinic acid, glutaric acid, adipic acid, suberic acid, azelaic acid, sebacic acid, isophthalic acid, 1,3- or 1,4-cyclohexanedicarboxylic acid, dimer, 5-sulfoisophthalic acid, hydroxybenzoic acid, naphthalenedicarboxylic acid and mixtures thereof.

Preferably the dicarboxylic acids are terephthalic acid, naphthalenedicarboxylic, isophthalic acid and cyclohexanedicarboxylic acid or mixtures thereof.

Preferably any additional acid is present in an amount between 0 and 50 mole %, more preferably between 0 and about 30 mole % and most preferably between 0 and about 25 mole %. The acid component may be used either as the dibasic acid or their lower alkyl esters as well as acid anhydrides and acid chlorides of the acids.

The glycol component of the polyester may be the same or different and is selected from glycols which contain 2 to about 12 carbon atoms. Preferably the glycols are selected from ethylene glycol, propylene glycol, 1,3-propanediol, 1,4-butanediol, 1,6-hexanediol, neopentyl glycol, 2,2,4,4-tetramethyl-1,3-cyclobutanediol, 1,3-, or 1,4-cyclohexanedimethanol (CHDM), diethylene glycol and mixtures thereof. The CHDM glycols may be in the cis- or trans- forms or as cis/trans mixtures. More preferably said glycol is selected from ethylene glycol, propylene glycol, 1,4-butanediol, diethylene glycol, CHDM and mixtures thereof. Most preferably said glycol is ethylene glycol, diethylene glycol, CHDM and mixtures thereof. Preferably any additional glycol is present in an amount between 0 and 50 mole %, more preferably between 0 and about 30 mole % and most preferably between 0 and about 20 mole %.

Typical polyesters suitable for use in the process of the present invention include PET, PEN, PET copolyesters containing 1–15 mole % isophthalic acid, PET copolyester containing 31 mole % CHDM, PET copolyester containing 18 mole % diethylene glycol, PET copolyester containing 37 mole % diethylene glycol, PET copolyester containing 20 mole % 1,4-butanediol, PET copolyester containing 1–15 mole % 2,6-naphthalene dicarboxylic acid, PET copolyester containing 25 mole % 2,6-naphthalene dicarboxylic acid, PET copolyester containing 75 mole % 2,6-naphthalene dicarboxylic acid, PET copolyester containing 3.5 mole % CHDM, PEN copolyester containing 0–10 mole % ethylene glycol, PEN copolyester containing 0–20 mole % terephthalic acid, PEN copolyester containing 1–10 mole % CHDM, PEN copolyester containing 15 mole % CHDM, PEN copolyester containing 1–10 mole % 1,6-hexanediol, PEN copolyester containing 5 mole % terephthalic acid and 5 mole % isophthalic acid and the like.

The copolyesters may also contain small amounts of branching agents such as about 0.1 to about 2 mole % of trimellitic acid, pyromellitic dianhydride, trimesic acid, glycerol, trimethylolpropane, pentaerythritol and the like. They may also contain other additives such as dyes, pigments, fillers, nucleating agents, antioxidants, slip agents and the like.

The polyester blend is not limited to two components. Multi-component blends like those disclosed in U.S. Pat. No. 5,006,613 can also be used. The composition and level of the third component added does not need to be such that a homogeneous melt is attained. The solid stating process will increase transesterification levels so that a homogeneous melt will result in subsequent processing. The third component can include most PET/PEN copolyesters and can include recycled polymer from a prior melt processing operation.

Generally, conventional solid stating equipment and conditions are used. Solid stating is preferably effected at a temperature of about 160° C. to about 250° C., which results in an optimum reaction rate at the lowest possible degree of thermal degradation. Preferred temperatures are between about 180° C. and about 245° C., and most preferred are between about 200° C. and 245° C.

Crystallization of the pellets may be conducted separately or concurrent in the solid stating step. Crystallization is preferably effected at a temperature between about 120° C. and about 250° C., more preferably between about 140° C. and 220° C. and most preferably between about 160° C. and 220° C.

Solid stating is generally conducted for about 1 to about 100 hours, preferably about 2 to about 24 hours and most preferably between about 2 and about 16 hours.

While an inert gas is not necessary to complete the transeterification according to the present invention, one may prefereably be used to remove the volatile reaction products from the solid state reactor. An inert gas is any gas which does not react or cause undesirable reaction in the pellets. Suitable inert gases include nitrogen and the noble gases. Gaseous mixtures derived from air but having a reduced oxygen content as compared to air may also be used as the inert gas under suitable conditions (such as contact time, moisture content, oxygen content, etc.) all of which are capable of determination by on of ordinary skill in the art. Nitrogen and gaseous mixtures derived from air are preferred because of their relatively low cost.

Solid stating conditions are widely known in the art, and any of these crystallization and/or solid stating processes may be used in connection with the present invention.

The inert gas may be recycled. Preferably, the recycled inert gas has a water content of less than 250 mg/kg $N_2$, an ethylene glycol content of less than 10 mg/kg $N_2$, an oxygen content of less than 10 mg/kg $N_2$, and an aldehyde content of less than 1 mg/kg $N_2$.

Suitable weight ratio of inert gas to granulate are generally known in the art. For example, in the solid state polycondensation can be about 0.7:1 to about 3:1 and preferably about 1:1 to about 2:1.

The level of transesterification in the blends discussed in this invention is measured by $^1$H NMR using the method shown by Stewart et al. The rational for the method is as follows: In a solution of PET and PEN homopolymers that have not been melt mixed, a $^1$H NMR peak due to the ethylene protons which are bonded to two terephthalate moieties and a $^1$H NMR peak due to ethylene protons that are bonded to two naphthalate moieties are observed. As the homopolymers undergo transesterification reactions a third $^1$H NMR peak appears which is due to ethylene protons that are bonded to one terephthalate moiety and one naphthalate moiety. This is often referred to as the transesterification peak. The level of transesterification is measured by $^1$H NMR by determining the relative area in the $^1$H NMR peaks of the three ethylene peaks. The relative area of the three peaks is compared to the theoretical level of transesterification for a PET/PEN random copolymer with the same overall composition of naphthalate and terephthalate moieties as the blend using Bernoullian statistics. The measured value of transesterification relative to the theoretical value of transesterification multiplied by 100 is reported as the level of transesterification. When random copolyesters prepared using conventional melt phase techniques are analyzed, transeterification values of about 100% are reported.

When a transesterification level of about 10% or greater is attained the blend is homogeneous as determined by the fabrication of visually clear articles. The term visually clear as used herein, means articles having a haze value of less than about 10% as measured via ASTM standard D1003-92. As used herein an immiscible blend is any blend which is visually hazy. Thus, immiscible blends generally display haze values greater than about 10%.

Transesterification reactions occur rapidly in the melt, as reported by Stewart, et al., Polymer, vol. 34, pg 4060–4067. For example, a PET/PEN blend containing 50 wt % PET mixed at 305° C. in an extruder resulted in transesterification levels of 7.8%, 20.2% and 26.6% for reaction times of approximately 1.5 minutes, 3 minutes and 4.5 minutes, respectively. The film of the blend was hazy with 7.8% transesterification but clear at the higher levels of transesterification.

However, controlling the transesterification level between about 10 and about 20% is difficult and blends with levels of transesterification greater than about 30% start to behave like random copolymers. Random copolymers are undesirable for some uses because generally, the material distribution of the resultant package is poor and often the package can not be used in its desired end use application. Thus, prior to the present invention the melt blending step had to be very carefully controlled, otherwise either opaque objects resulted or the resultant clear articles could not be fabricated into articles satisfactory for their desired application.

Acetaldehyde generation was determined by the following method. Twenty grams of polyester pellets were dried in a vacuum oven for about 16 hours at 120° C. Seven grams of each sample was loaded into a Tinius-Olsen Melt Indexer at the desired test temperature and held at that temperature for five minutes. The samples were extruded into a water bath and stored at a temperature of –40° C. until grinding. The rod was chopped in smaller pieces and ground to 20 mesh or finer. The ground sample (0.5000 grams) was placed in a sample tube which was immediately sealed. The samples were analyzed by dynamic headspace gas chromatographic analysis using a Hewlett-Packard 5890 Gas Chromatograph with a Perkin Elmer Automatic Thermal Desorption ATD-50 as the injection system. Acetaldehyde was desorbed by heating the sample at 150° C. for ten minutes. The gas chromatography column has a 30 m by 0.53 mm inside diameter.

I.V.'s were measured as follows, 0.5 wt % of the polyester was dissolved in a 60:40 phenol:tetrachloroethane cosolvent at 25° C.

The acetaldehyde generation values are reported as an average of two experiments and expressed as parts of acetaldehyde per one million parts of polyester (ppm).

The following examples will further illustrate the invention.

EXAMPLE 1

PET/PEN Blend Containing 15 Mole % PEN and 10.7% Transesterification

Eight thousand one hundred and sixty grams of PET pellets (I.V.=0.70) were dry blended with one thousand eight hundred and fifty grams of PEN pellets (I.V.=0.56) and dried for about 4 hours at 150° C. in a dehumidifying drier. The mixture was extruded on a 1.5 inch Killion extruder equipped with a twelve inch wide film die. All heating zones were set at about 295° C. and the residence time in the extruder was approximately 1.5 minutes. The film had a hazy, opaque appearance. The level of transesterification of the blend as measured by $^1$H NMR was 11%. The composition of the film as measured by $^1$H NMR was 15 mole % PEN and 85 mole % PET and the film I.V. is 0.62.

EXAMPLE 2

PET/PEN Blend Containing 15 Mole % PEN and 2.7% Transesterification

Example 1 was repeated, except that a rod dye was used on the extruder. The melt blended polymer had a hazy, opaque appearance and was stranded and pelletized. The level of transesterification of the blend as measured by $^1$H NMR was 3%. The composition of the blend as measured by $^1$H NMR was 15 mole % PEN and 85 mole % PET and the I.V. is 0.57. Thus, even though the melt blending conditions were nearly identical (except for the dye used) the level of transesterification was one third less than the the transesterification level in Example 1.

EXAMPLE 3

Comparative Example–PET/PEN Blend Containing 15 Mole % PEN and 20.2% Transesterification Five thousand grams of melt blended pellets containing 15 mole % PEN prepared in Example 2 were dried for about 4 hours at 150° C. in a dehumidifying drier. The pellets were extruded as described in Example 1 to simulate a second extruder pass. The film was clear. The level of transesterification of the blend as measured by $^1$H NMR was 20% This level was achieved in 1.5 minutes. The composition of the film as measured by $^1$H NMR was 15 mole % PEN and 85 mole % PET and the film I.V. is 0.55.

EXAMPLE 4

Solid State Polymerization of PET/PEN Blend Containing 15 Mole % PEN and 2.7% Transesterification Seven hundred grams of the hazy pellets from Example 2 were crystallized in a forced-air oven for about 20 minutes in an 180° C. oven. The crystallized pellets (I.V.=0.57) were placed in a laboratory solid stating unit similar to that as shown in FIG. 1. The unit was heated to 217° C. by a diethyl succinate reflux around the jacketed inside cylinder which holds the pellets. The pellets were subjected to a nitrogen gas flow through a sintered glass filter at a rate of about four standard cubic feet per hour. The I.V. and level of transesterification of the blend increased gradually with solid state polymerization time. After four hours the I.V. of the blend increased to about 0.65 and the transesterification level increased to about 9.4%. After eight hours the pellets were removed from the solid state polymerization unit. The I.V. of the pellets was about 0.73 (25% higher than the melt blended blend of Example 3) and the transesterification level was about 13% and was accomplished over eight hours. The extent of the increase in I.V. as well as the gradual and controlled increase in transesterification was surprising.

The composition of the pellets as measured by $^1$H NMR was 15 mole % PEN and 85 mole % PET. The Differential Scanning Calorimetry (DSC) curve of the eight hour sample shows a $T_m$ of 241° C., a $\Delta H_f$ of 13.2 cal/g on the first heating cycle.

EXAMPLE 5

Example of the Invention—PET/PEN Blend Containing 15 Mole % PEN and 19.1% Transesterification Five hundred grams of pellets containing 15 mole % PEN prepared in Example 4 were dried for about 4 hours at 150° C. in a dehumidifying drier. The pellets were extruded as described in Example 1, except that the heating zones were set at about 285° C. The film was clear. The level of transesterification of the blend as measured by $^1$H NMR was about 18%. The composition of the film as measured by $^1$H NMR was 15 mole % PEN and 85 mole % PET and the I.V. is 0.70. Thus the immiscible or hazy pellets processed according to the present invention are readily extruded into clear articles. Prior to the present invention, it was believed that transesterification levels sufficient to insure clarity in the final article needed to be attained primarily via melt blending.

EXAMPLE 6

Figure 2:
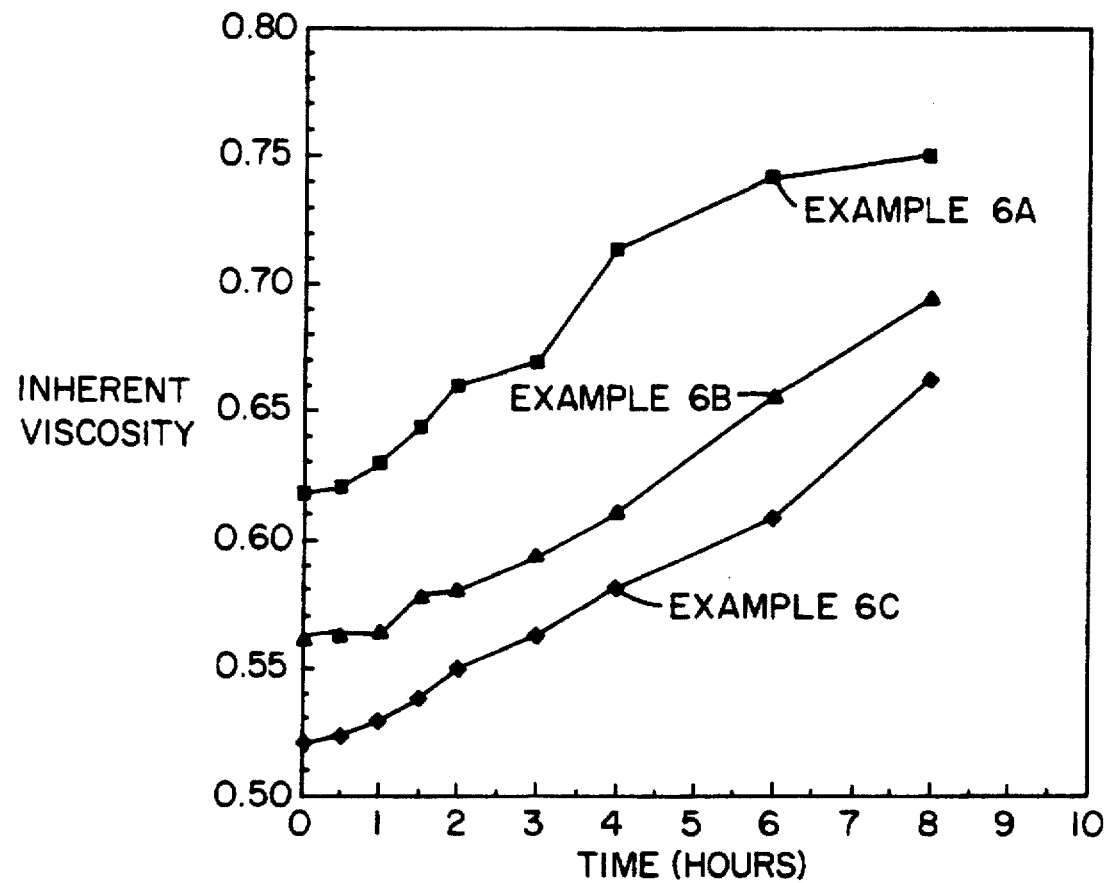
FIG. 2 is a graph depicting the effect of Solid State Polymerization time on blend I.V.
Figure 3:
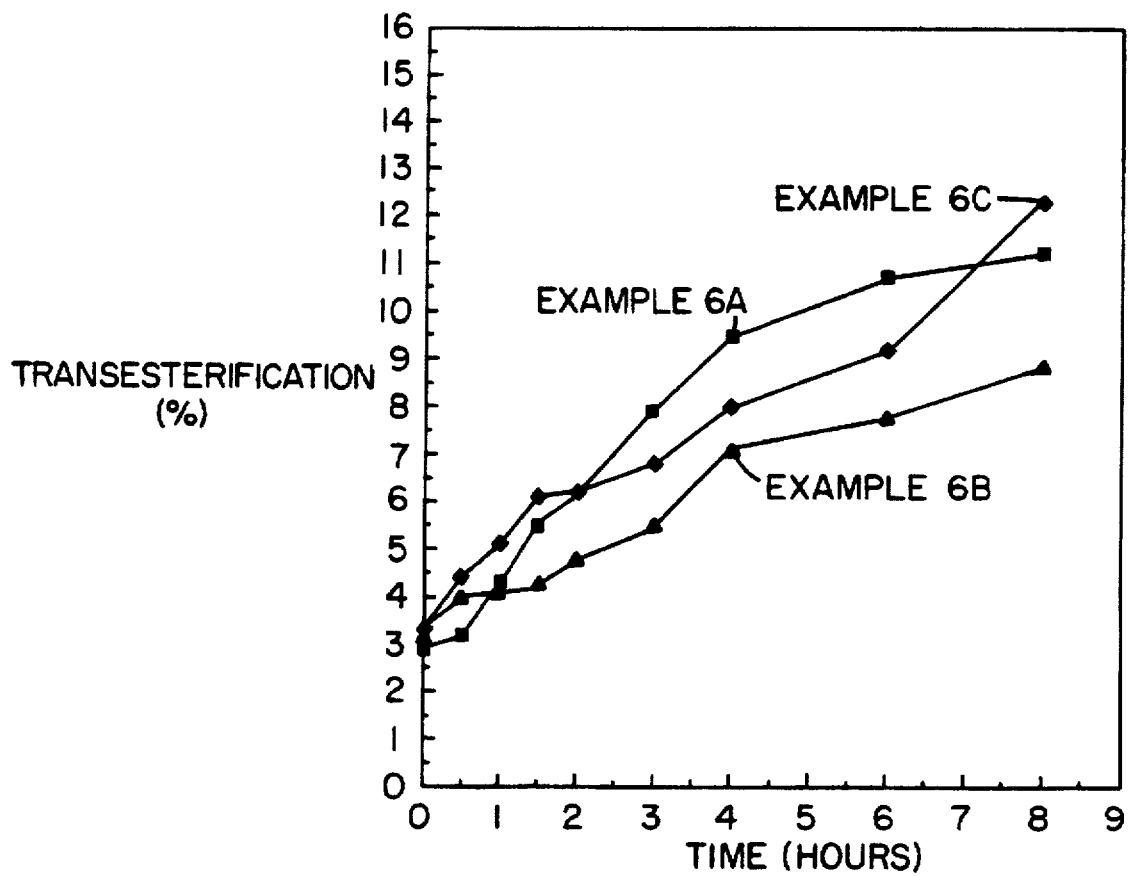
FIG. 3 is a graph depicting the effect of Solid State Polymerization time on blend Transesterification level.

Example of the Invention—Solid State Polymerization of PET/PEN Blends Containing 5, 40 and 65 mole % PEN and Less Than 5% Transesterification Pellet/pellet blends of PET/PEN (5, 40 and 65 mole %) were prepared and dried for about 16 hours at 150° C. in a dehumidifying drier. The pellets were extruded as described in Example 1, except that a rod die was used. The molten polymers had a hazy, opaque appearance and were stranded and pelletized. The level of transesterification of the blends as measured by $^1$H NMR was about 3%, 3% and 4% for blends containing 5, 40 and 65 mole % PEN, respectively. The I.V. of the blends generated in Examples 6A, 6B and 6C were 0.63, 0.55 and 0.52, respectively. The crystallized pellets were placed in separate laboratory solid stating units at 217° C. similar to that as shown in FIG. 1. The I.V. and level of transesterification of the blends increased gradually with solid state polymerization time as shown in FIGS. 2 and 3. In FIGS. 2 and 3, Example 6A refers to the blend containing 5 mole % PEN, Example 6B refers to the blend containing 40 mole % PEN and Example 6C refers to the blend containing 65 mole % PEN. These examples shows the a wide composition range of PET/PEN blends that are hazy and have low levels of transesterification can be polymerized in the solid state to give increases in I.V. and substantial increases in levels of transesterification sufficient to impart clarity to a final article.

EXAMPLE 7

Example of the Invention—Solid State Polymerization of PET/PEN Blend Containing 15, 40 and 65 Mole % PEN and About 3-4% Transesterification Seven hundred grams of hazy pellets from Example 2, 6B and 6C which had not been solid stated were crystallized in a forced-air oven for about 20 minutes at 180° C. The crystallized pellets were placed in separate laboratory solid stating units similar to that shown in FIG. 1. The unit was heated to 217° C. by a diethyl succinate reflux around the jacketed inside cylinder which holds the pellets. The pellets were subjected to a nitrogen gas flow through a sintered glass filter at a rate of four standard cubic feet per hour. The I.V. and level of transesterification of the blend increased gradually with solid state polymerization time. After ten hours the pellets were removed from the solid state polymerization unit. The sample containing 15 mole % PEN, 40 mole % PEN and 65 mole % PEN were designated 7A, 7B and 7C, respectively. The I.V. of Examples 7A, 7B and 7C were 0.79, 0.69 and 0.66, respectively. The transesterification level of Examples 7A, 7B and 7C were about 15%, 11% and 12%, respectively.

EXAMPLE 8

Comparative Example—PET/PEN Blends Containing 40 and 65 mole % PEN with Higher Transesterification Levels from Melt Blending One thousand grams of hazy pellets from Example 6B and 6C were dried for about 4 hours at 150° C. in a dehumidifying drier. The pellets were extruded as described in Example 1 except that a rod die was used. The extruded polymer containing 40 mole % PEN is referred to as 8B and the blend containing 65 mole % PEN is referred to as Example 8C. The molten polymer of Example 8B and 8C was clear. The level of transesterification of the blends as measured by $^1$H NMR was about 11% and 12% for Examples 8B and 8C, respectively. The I.V. of Examples 8B and 8C was 0.50, and 0.48, respectively. These examples show that melt blending can produce clear articles; however, the level of transesterification is difficult to control, the I.V. of the blends decreases upon extrusion and the number of extruder passes needed to produce clear articles is dependent on the overall composition of the blend.

Acetaldehyde Generation Levels in PET/PEN Blends

The acetaldehyde generation levels were measured for Examples 4, 7A, 7B, 7C, 8B and 8C at 275° C. and 295° C. The extruded rods of all the Examples after the 5 minute hold time in the Tinius Olsen Melt Indexer were clear. The results of the acetaldehyde tests are listed in Table 1. The PET/PEN blends that were prepared by the solid state procedure all exhibit much lower acetaldehyde levels than those prepared by melt blending and that clear articles can be achieved.

TABLE 1

Acetaldehyde Generation for PET/PEN Blends

| Example | Blend Composition (PEN mole %) | Transesterification Level Before Test | Acetaldehyde Generated at 275° C. (ppm) | Acetaldehyde Generated at 295° C. (ppm) |
|---|---|---|---|---|
| 4  | 15 | 7  | 6.94 | 20.10 |
| 7A | 15 | 15 | 4.16 | 12.91 |
| 8B | 40 | 11 | 7.25 | 16.57 |
| 7B | 40 | 11 | 4.32 | 13.85 |
| 8C | 65 | 12 | 7.61 | 16.44 |
| 7C | 65 | 12 | 3.94 | 11.60 |

Thus, the foregoing examples clearly show that the process provides superior control over the degree of blend esterification than prior art processes. It is very important to be able to produce blends having the same levels of transesterification to insure that uniform products can be consistently produced. Moreover, the superior properties (I.V., low color and acetaldehyde) and consistent results can be achieved without additives.

We claim:

1. A process comprising:
   solid state polymerizing an immiscible polyester blend comprising a first polyester of poly(ethylene) terephthalate homopolymer or copolymer and a second polyester of poly(ethylene) naphthalenedicarboxylate homopolymer or copolymer, wherein said immiscible polyester blend displays a transesterification level of less than about 10% under conditions sufficient to produce a polyester blend having a transesterification level between about 10% and about 20% which when remelted becomes clear.

2. The process of claim 1 wherein said immiscible polyester is not significantly melt blended prior to said solid state polymerizing.

3. The process of claim 1 wherein said conditions include a solid stating temperature between about 160° C. and about 250° C.

4. The process of claim 1 wherein said conditions include a solid stating temperature between about 180° and about 245° C.

5. The process of claim 1 wherein said conditions include a solid stating temperature between about 200° and about 245° C.

6. The process of claim 1 further comprising the step of crystallizing said immiscible polyester blend prior to said solid state polymerizing at a crystallization temperature of between about 120° C. and 250° C.

7. The process of claim 6 wherein said crystallization temperature is between about 140° C. and about 220° C.

8. The process of claim 7 wherein said crystallization temperature is between about 160° C. and about 220° C.

9. The process of claim 1 wherein said polymerizing is conducted in the presence of an inert gas.

10. The process of claim 1 wherein said immiscible blend has a level of transesterification of less than about 5%.

11. The process of claim 1 wherein said immiscible blend has a haze value of greater than about 10%.

12. The process of claim 1 wherein said solid stated polymer blend has a haze value of greater than about 5%.

13. The process of claim 1 further comprising the step of reextruding said solid stated polyester blend under conditions sufficient to produce a clear product.

* * * * *

Disclaimer 5,688,874—Douglas Claire Hoffman, Kingsport, Tenn. PROCESS FOR PREPARING BLENDS OF POLY(ETHYLENE TEREPHTHALATE) AND POLY (ETHLENE 2,6-NAPHTHALENEDICARBOXYLATE). Patent dated November 18, 1997. Disclaimer and Dedication filed May 11, 1998, by the assignee, Eastman Chemical Co.

Hereby disclaims and dedicates to the Public all claims of said patent.
*(Official Gazette,* July 14, 1998)